United States Patent

Nupnau

[15] 3,640,612
[45] Feb. 8, 1972

[54] AUTOMATIC REWIND FOR MOTION PICTURE PROJECTORS

[72] Inventor: Arthur E. Nupnau, Chicago, Ill.
[73] Assignee: Bell & Howell Company, Chicago, Ill.
[22] Filed: Oct. 6, 1969
[21] Appl. No.: 863,867

[52] U.S. Cl. ............................................. 352/124, 352/173
[51] Int. Cl. ................................. G03b 23/00, G03b 1/00
[58] Field of Search .............. 352/124, 158, 173; 242/201, 242/205; 74/354

[56] References Cited

UNITED STATES PATENTS

| 2,190,198 | 2/1940 | Stechbart | 352/124 |
| 2,907,532 | 10/1959 | Briskin et al. | 352/124 |
| 3,028,767 | 4/1962 | Moore | 74/354 |
| 3,053,465 | 9/1962 | Michaels | 352/158 |
| 3,240,550 | 3/1966 | Mitchell et al. | 352/124 |
| 3,514,196 | 5/1970 | Roman | 352/124 |

Primary Examiner—S. Clement Swisher
Attorney—William F. Pinsak and David Manly Heller

[57] ABSTRACT

A mechanism in a sprocketless motion picture projector for rewinding film on a supply reel including a friction drive for taking up film on the supply reel during a reverse projection mode, a positive drive for winding film on the supply reel during a rewind mode and a control means operable by a film tension sensing means to automatically cause the positive drive to bypass the friction drive when changing from a projection mode to the rewind mode.

8 Claims, 10 Drawing Figures

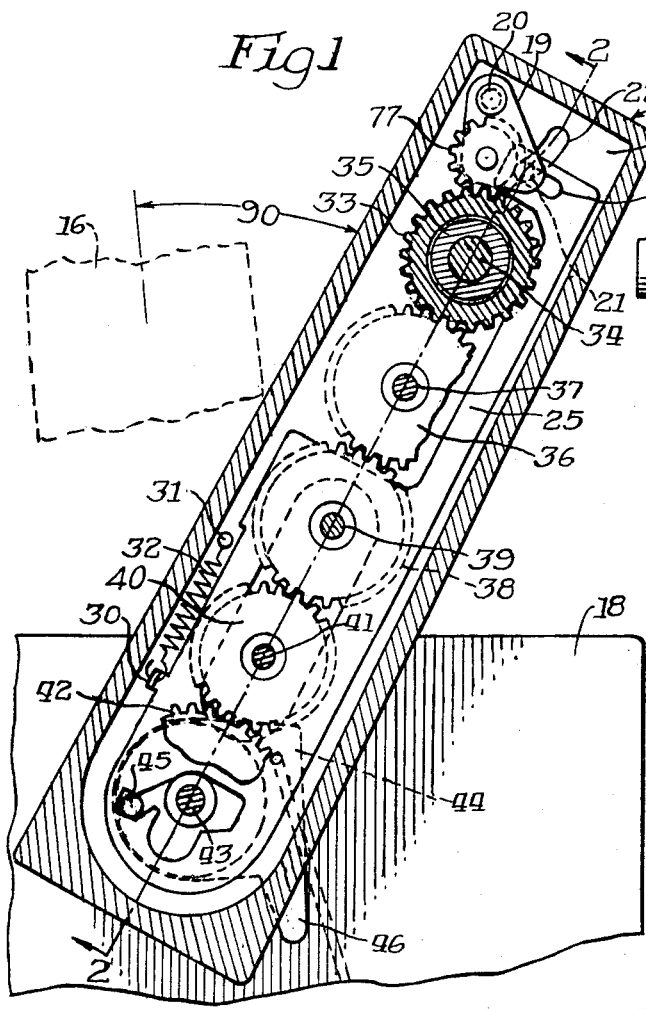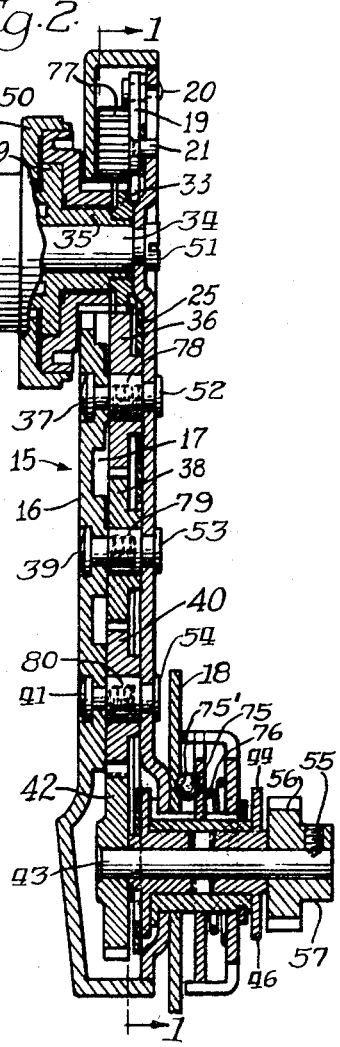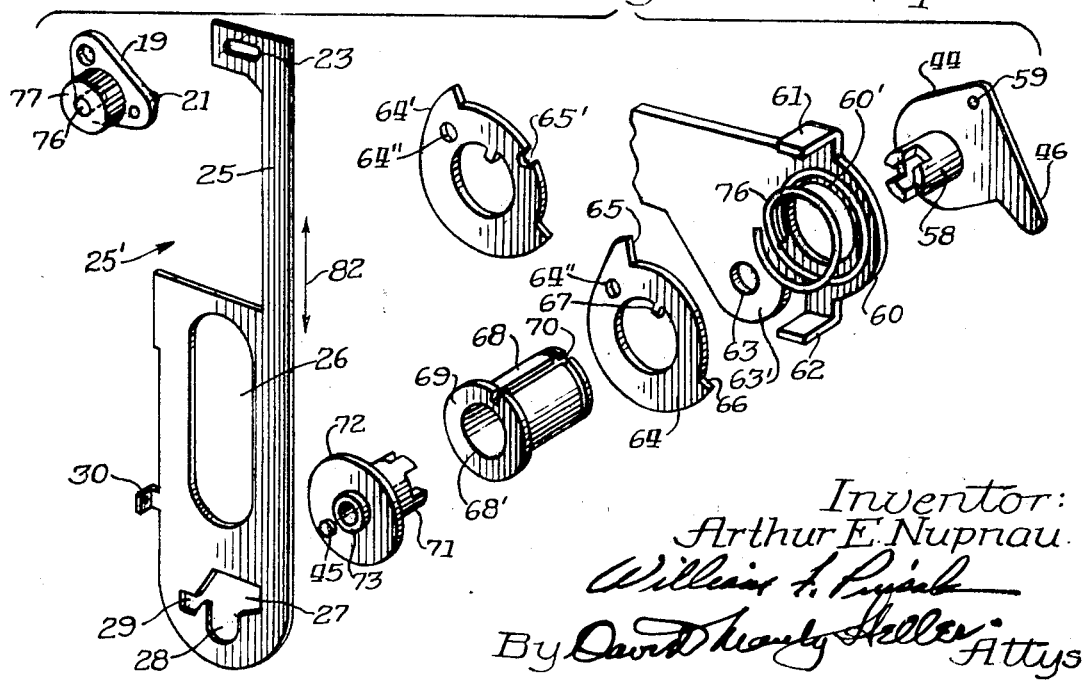

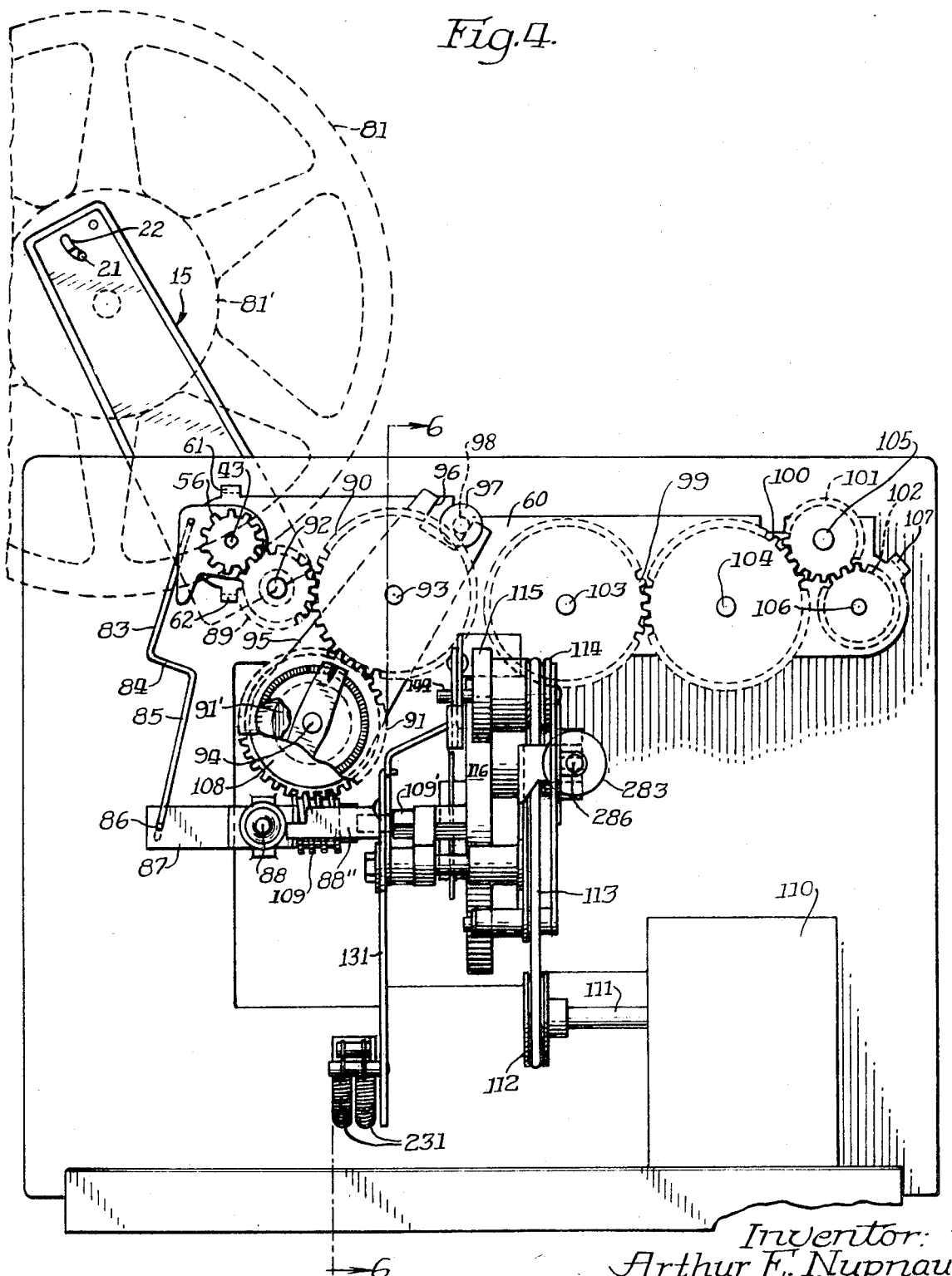

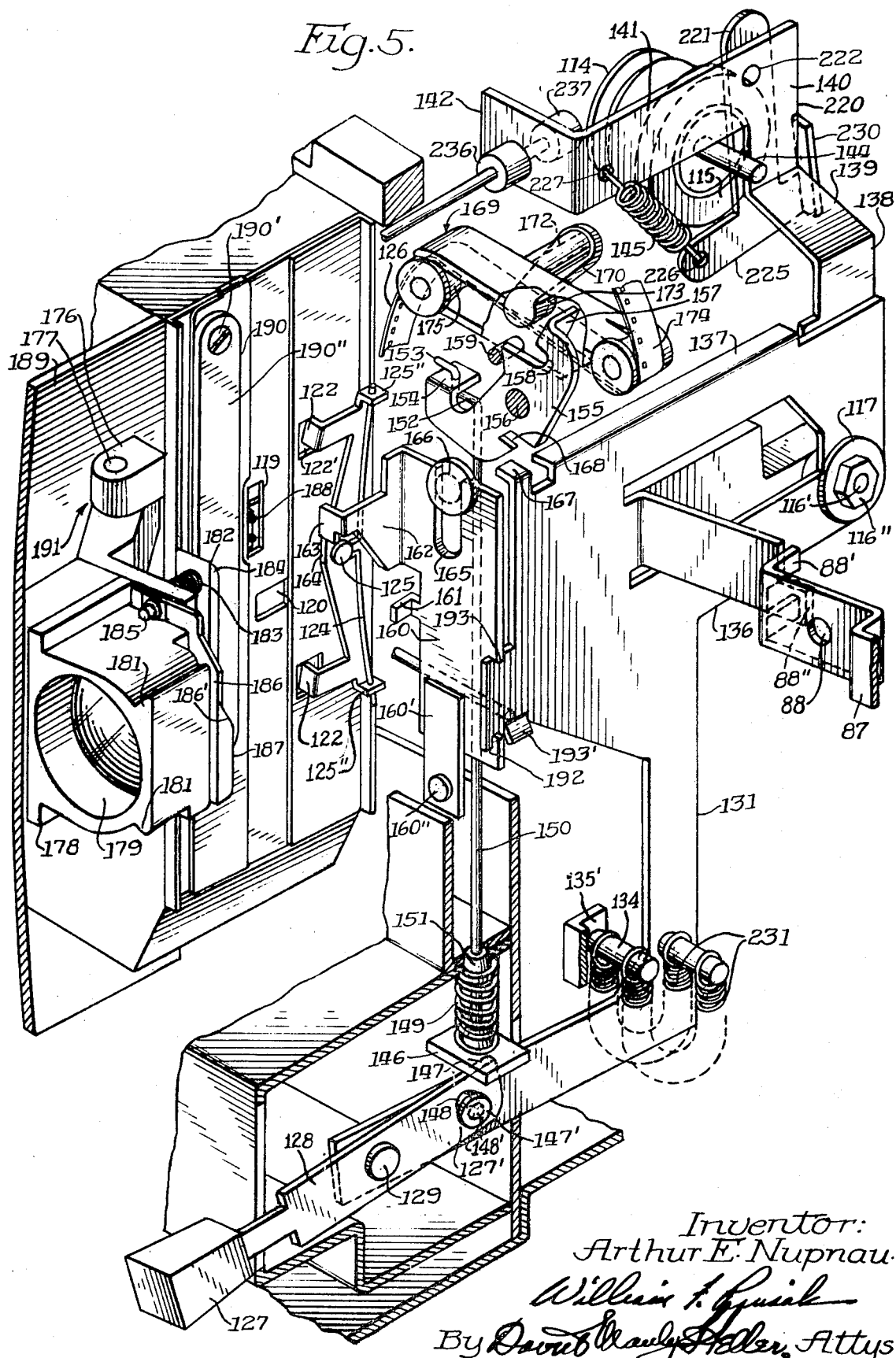

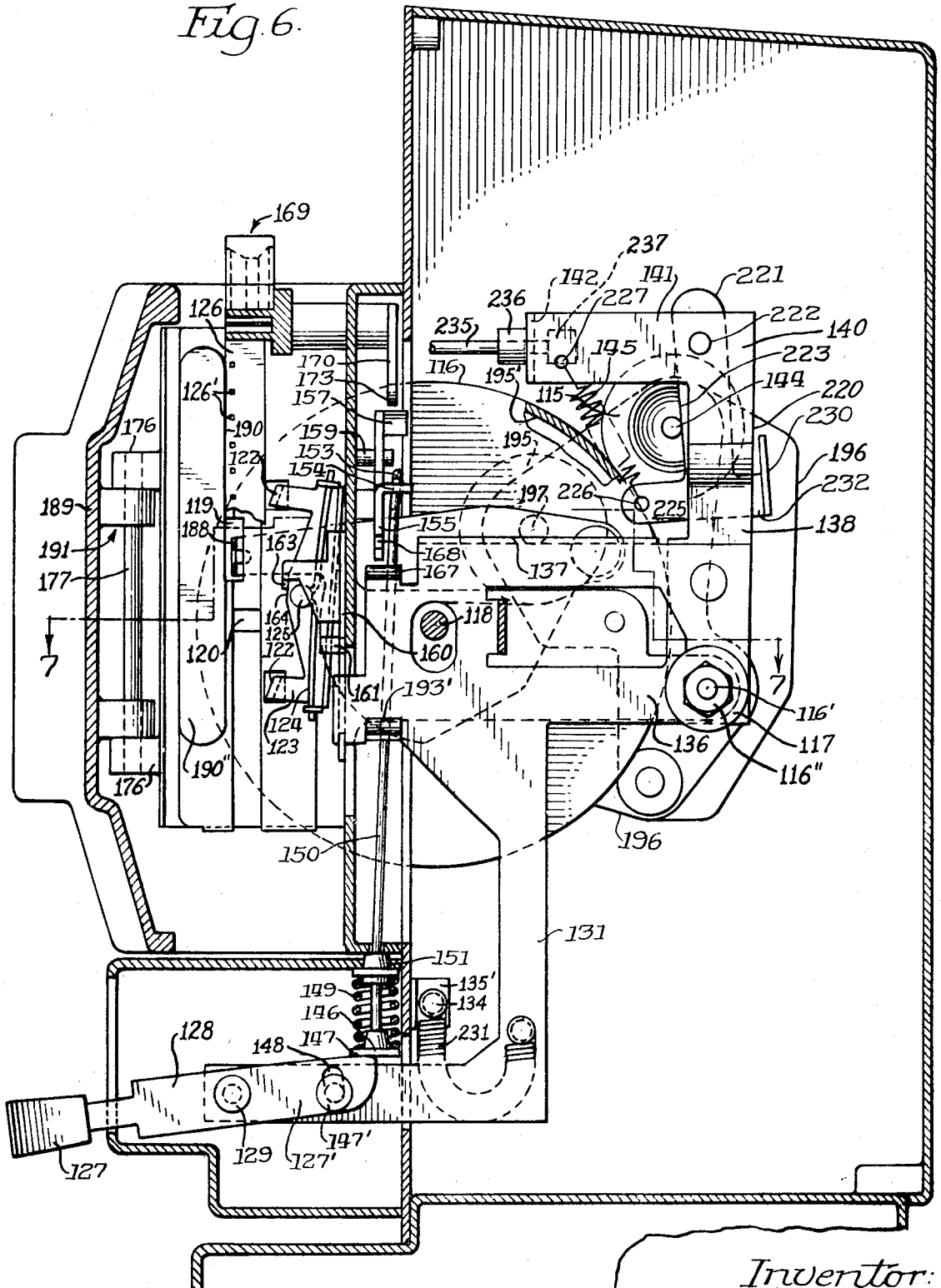

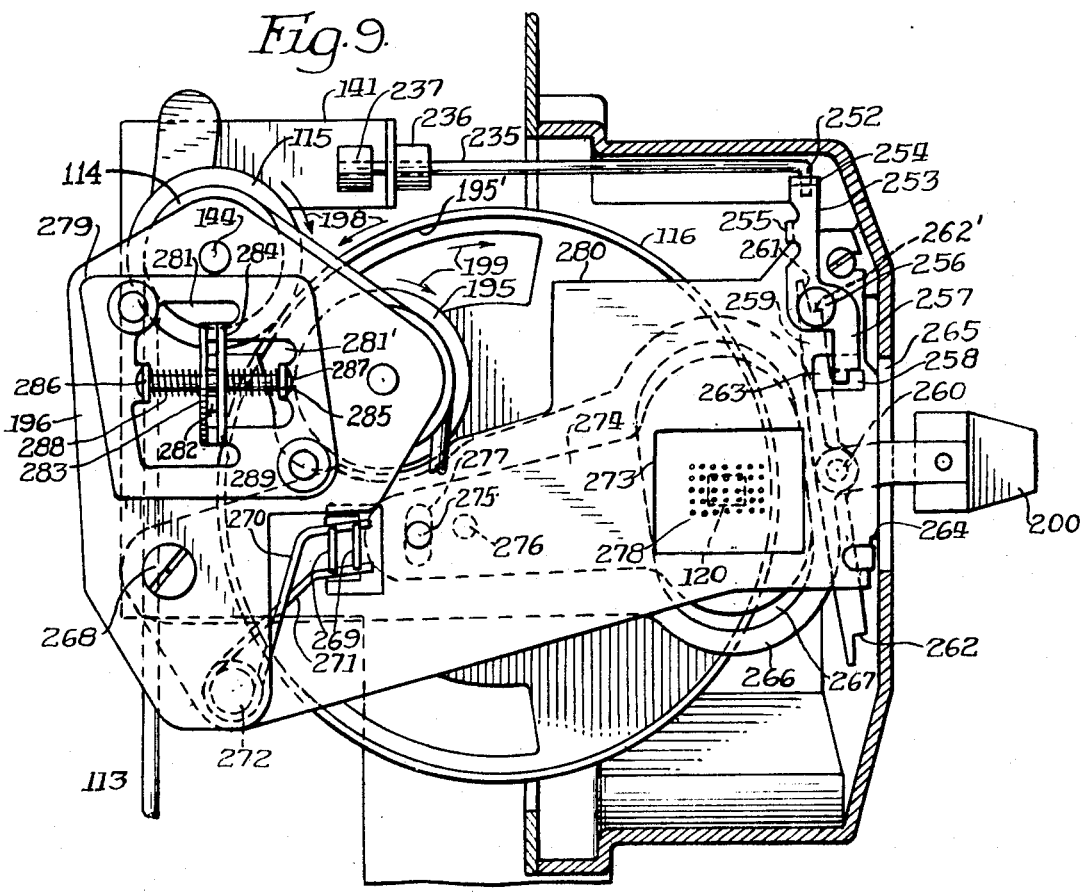
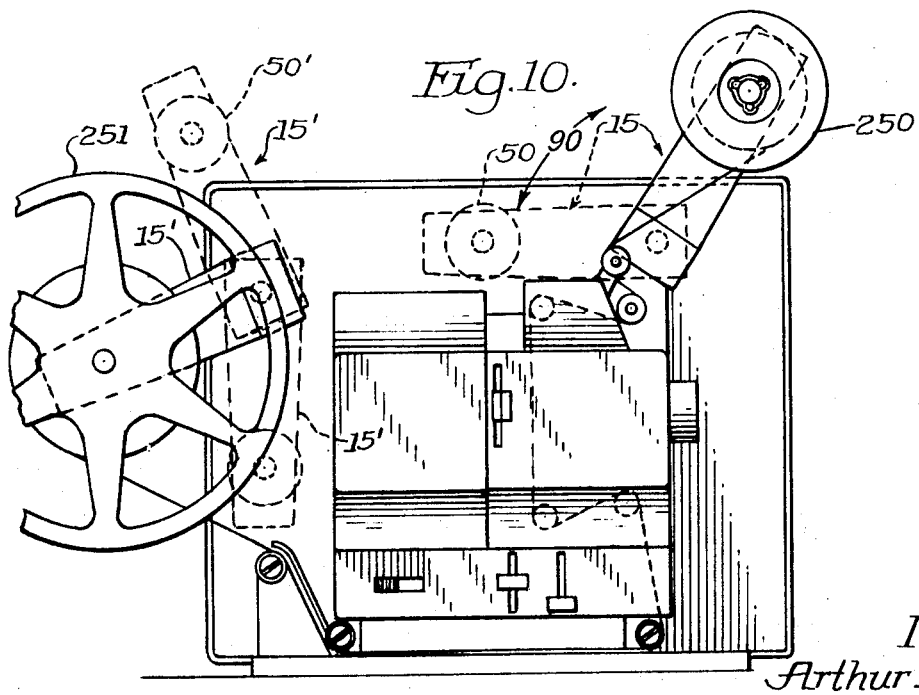

3,640,612

AUTOMATIC REWIND FOR MOTION PICTURE PROJECTORS

Precedent patents are U.S. Pat. No. 3,331,541, dated July 18, 1967, patentee J. Cherniavskyj et al. and assigned to Bell & Howell Company; U.S. Pat. No. 3,326,482, dated June 20, 1967, patentee B. Michaels et al. and assigned to Bell & Howell Company; U.S. Pat. No. 3,053,465, dated Sept. 11, 1962, patentee B. Michaels and assigned to Bell & Howell Company.

SUMMARY OF THE INVENTION

The instant invention is equipped with mechanism for automatically rewinding film after its complete or partial exposure in a projector which is sprocketless. The film is conventional and provided with sprocket holes for engagement by a shuttle mechanism which moves the shuttle tooth or claw up and down and into and out of the sprocket holes respectively in synchronization with the shutter and aperture structure of the projector. When the film which is securely attached to the hub of the supply reel is completely projected, a tension created in the film causes a snubber assembly to be urged to actuating position which in turn throws into play a rewind mechanism which simultaneously reverses the claw movement and maintains it out of engagement with sprocket holes, and also throws the control lever from "run" to "rewind" position. A manual control for rewind permits respected exposure of film already viewed.

The instant invention refers to an automatic as well as to an optional rewind mechanism used in connection with a sprocketless film projector.

An object of the invention is to provide automatic rewind mechanism used in a sprocketless projector.

Another object of the invention is to provide a mechanism of the aforementioned character which is actuated by a snubber mechanism.

Another object of the invention is to provide a mechanism of the character to be hereinafter described, which will put into operation a rewind structure controllable by the tension to which the film is subjected when the film on the supply reel is entirely unwound.

Another object of the invention is to provide a mechanism which will automatically rewind and reset the manual control to the rewind position at the same time.

Another object of the invention is to provide a film exposure and rewind transmission consisting of a train of gears concealed in each of two reel carrying arms, toothed clutchlike mechanism in concert with friction clutch mechanism used to alternately cause the supply reel to be the driver and the rewind reel the idler, or vice versa.

Another object of the invention is to provide reel supporting arms which are mounted so as to be adjustably positioned radially for the most convenient position for projection, and yet can be disposed within the area confines of the projector when not in use or for carrying about, or transportation, or shipment.

Another object of the invention is to provide a mechanism of the aforementioned character which is simple and practical in construction, efficient for the purposes for which it is purported to be used, and as well economical to manufacture in quantity production.

Further and other objects will be apparent from the description of the accompanying drawings, in which like parts are designated by like numerals.

BRIEF DESCRIPTION OF THE DRAWING

FIG. 1 is a longitudinal cross-sectional view taken substantially on the line 1—1 of FIG. 2 depicting one of the reel supporting arms disclosing the train of gearing and the toothed clutchlike mechanism working in concert with the friction clutch units.

FIG. 2 is a longitudinal cross-sectional view taken, substantially, on the line 2—2 of FIG. 1.

FIG. 3 is an exploded view in perspective showing the elemental structure comprising the toothed clutch mechanism.

FIG. 4 is an elevational view of the train of gearing mounted interiorly of the projector, and which works in concert with the gearing within the reel supporting arms.

FIG. 5 is a perspective view indicating several tripping motions actuated by the rewind lever.

FIG. 6 is a longitudinal cross-sectional view taken substantially on line 6—6 of FIG. 4.

FIG. 9 is a cross-sectional view taken substantially on line 9—9 of FIG. 7, looking in the direction of arrows.

FIG. 10 is a general superficial front elevational view showing a projector and the reel supporting arms in operative and inoperative positions.

DESCRIPTION OF THE ILLUSTRATED EMBODIMENT REWIND MECHANISM

Figure 7:
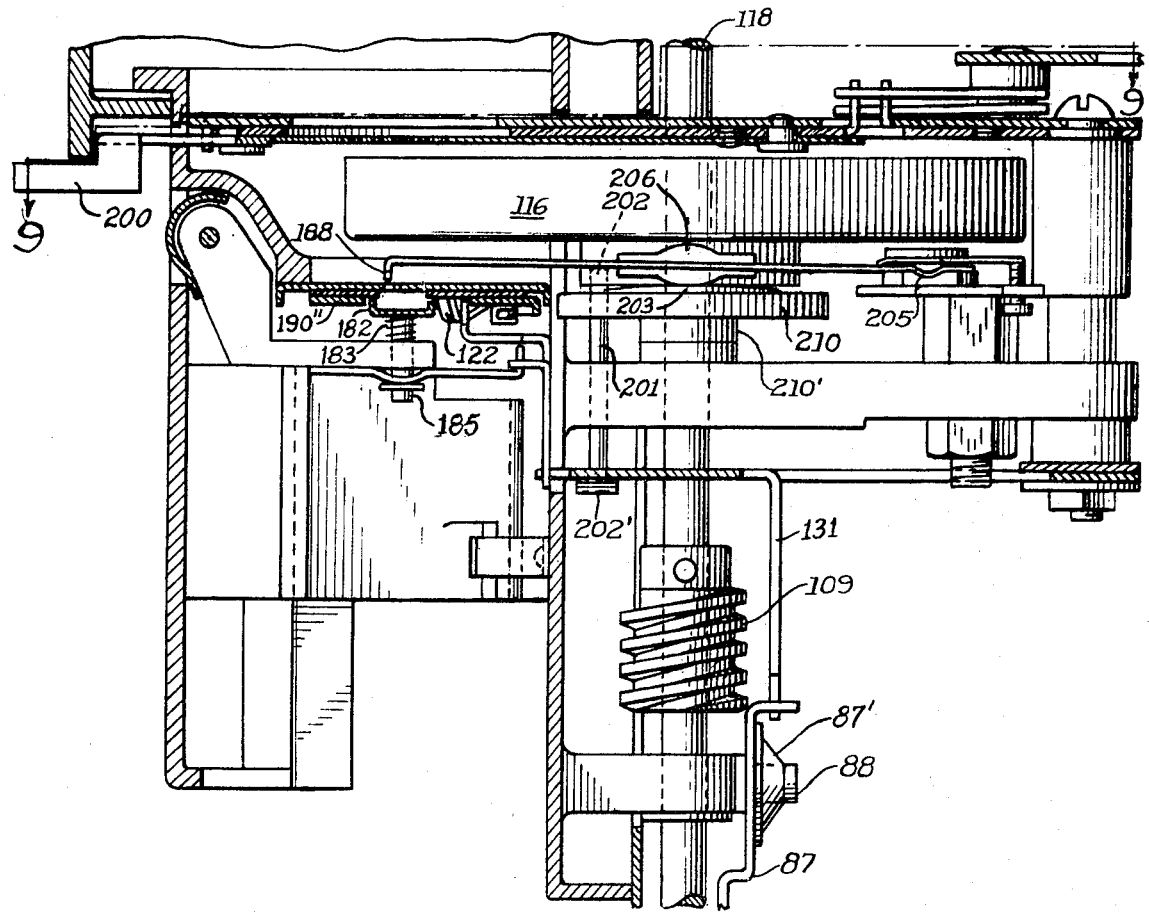
FIG. 7 is a transverse cross-sectional view taken substantially on line 7—7 of FIG. 6.

Referring to FIGS. 1, 2 and 3, a reel-supporting arm is generally designated 15 and consists of a hollow rectangularly shaped shell 16 provided with a well 17 in which the mechanism for driving or idling a reel is mounted. A gear 33 is mounted to rotate on axis 34 by virtue of intermediate friction clutch 35. Gear 36 mounted on axle 37 meshes with gear 33 and also with gear 38 rotatably secured on axle 39; the gear 38 in turn is in mesh with gear 40 rotating on axle 41; gear 40 ultimately is in mesh with gear 42 rotating on axis 43. This gearing is considered as the reel arm support train of gears.

It should be noted that elements 37, 39 and 41 are threadably secured to nut elements 52, 53 and 54 securing spacer elements or bushings 78, 79, and 80 upon which the gears rotate. The screw element 51 maintains the friction clutch elements 49 and 50 in assembly.

A shaft 34' equipped with spring 48 urging ball 47 yieldably against slight pressure or force secures releasably a reel 81, see FIG. 2.

The arms 15 are articulately secured to the front plate 18 of the projector and are adapted to rotate to idle positions as indicated in dotted lines FIG. 1 and FIG. 10. Referring to FIG. 3 a pinion 77 mounted articulately on pin 20, the pin 20 being mounted interiorly of well 17, a triangular plate 19 serving as support for pinion 77 as well as motivating pin 21.

When motivating pin 21 is moved it articulates pinion 77 about the pivot 20 moving in the radial slot 22 and the slot 23 which intersects radial slot 22. The reel arm actuating slide 25 is recessed 25' for clearance for gears 33 and 36, and ovate slot 26 which provides clearance for gears 38 and 40. The reel arm actuating lever 25 moves in the direction of arrows 82. The notch 29 merging with recess 27 and semicircular recess 28 permits the reel arm assembly 15 to be rotated through the arcuate orbit mentioned heretofore. The reel arm actuating slide 25 is provided with a lug 30 which cooperates with a pin 31 to anchor the spring 32 which biases the pinion 77 out of mesh from the gear 33.

To move the reel arm actuating slide 25 (see FIG. 3), a motion change lever arm 44 having integral therewith one part 58 of a toothed clutchlike portion, a drilled hole 59 serving to connect to a bent wire connecting rod 83 being offset at 84 for clearance purposes (see FIG. 4) and terminating in an extension 85 articulately connected at 86 to a rewind link 87 pivotally secured at 88.

Returning to FIG. 3, it should be noted that motion change lever arm 44 has a stop lug 46 operable to abut against an axle 92 (FIG. 4) in order to prevent connecting rod 83 from moving past dead center to the right of FIG. 4.

A gear plate 60 having a bore 60' and stop lugs 61 and 62 which also act as spacers from plate 18 in order to accommodate parts 64, 68, companion toothed clutchlike portion 71 which has a flange 72, a spacing hub 73 and pin 45 which motivates the reel arm actuating slide 25 as heretofore explained. An extended ear portion 63' furnishes room for a bore 63 on which gear 89 is supported which is in mesh with pinion 56 having hub 57, and is secured to shaft 43 by means of setscrew 55. The circular disc 64 has a small hole 64" engageable releasably by a ball 75 being urged toward projector wall 18 by compression spring 76 for holding arm 15 in the position as shown in FIGS. 1 and 2. An arcuately shaped portion is cut away from disc 64 to form stops 65 and 66 abutting against lugs 61 and 62 to limit the movement of reel arms 15 when rotated as shown by arrow 90, see FIG. 10. The disc 64 is also equipped with a key 67 operative slidably in key slot 70 of bushing 68 having a head portion 69 and a bore 68' to accommodate clutchlike elements 58 and 71. The disc 64' is provided with a notch 65' to permit setting takeup reel in two different angular positions. When all elements are compactly assembled, they assume the arrangement illustrated in FIG. 2. It should be noted (see FIG. 1) that the arcuate slot 22 in concert with the elongated straight slot 23 form a common locking intersection to retain pin 21 firmly but yieldably when reel arm actuating slide 25 is moved in order to disengage pinion 77 from meshing engagement. It should also be noted that parts 58 and 71 are not functioning as a clutch mechanism which is intermittently engaged and disengaged but merely a facility or expedient for assembly of the mechanism.

FIG. 4 illustrates the gear plate 60 which supports a train of gears including a gear 89 pivoted on an axle 92. A gear 90 is pivoted on an axle 93 which is supported on a yoke 95. A gear 91, a gear 108 and the yoke 95 are mounted pivotally on an axle 94. The yoke 95 articulates to the left or to the right in a limited manner, a yoke slot 96 being confined below a headed stud 97 and limited by a body 98 of stud 97 causing gear 90 to mesh with gear 89 or be disengaged by frictional control of its hub 91' with yoke 95 until resistance causes gear 91 to slip dependent on transmission directions.

Gear 90, when in mesh with gear 89, is being driven by gear 91 which is motivated by a worm gear 108 located on the same axle 94 and behind gear 91. The worm gear 108 is driven by worm 109 (see FIG. 4) so that the worm 109 through yoke gearing 90 and 91 drives gear 89 and gear 56 through toothed clutchlike parts 58 and 71, driving supply reel 81 in rewind direction when pin 21 is at the low point of intersection of arcuate slot 22 and elongated slot 23. Slot 22 is the moving director of pinion 77. When rotation of direction of the worm 109 is reversed, or counterclockwise, the inertia of yoke 95 together with its frictional contact with hub 91' creates a thrust by the worm threads initially swinging yoke 95 counterclockwise.

When pin 21 is positioned at the top of arcuate slot 22, than yoke 95 swings over to engage gear 90 with gear 99 mounted on pin 103, which in turn engages gear 100 mounted on pin 104 ultimately meshing with gear 101 mounted on pin 105 and gear 102 mounted on pin 106. The gear 102 is connected with gearing (not shown through similar clutch means as the gear train enclosed in reel supply arm 15') in reel takeup arm 15 (see FIG. 10) with the exception that the train in the reel takeup arm does not have a triangularly shaped bracketed pinion assembly 19.

POWER DRIVE

Referring to FIGS. 7 and 9, the three-bladed shutter 116 is mounted on the worm shaft 118 and rotates the worm 109. The drive from prime mover 110 is a driving shaft 111 equipped with a pulley 112, a companion pulley 114 over which a round sectional belt 113 is trained to function; the belt 113 is also trained over a second pulley 195 both pulleys 114 and 195 being mounted on oscillating bracket 196, and (see FIG. 9) causing three bladed shutter 116 to be driven either in the direction shown by arrows 198, or counterclockwise, or in the opposed direction as shown by arrow 199. The rewind link 87 pivoted at 88 (see FIG. 5) has a bifurcated terminal portion 88' engaging a tongue 88" of arm shift lever 131.

FIG. 5 indicates in perspective the many elements and their functions when the manual control 127 is moved to either of two positions, namely, "RUN" or forward projection, or "REWIND" when film is picked up by the takeup film reel.

The manual control 127 is pivoted at 148', its terminal portion 147 having an elongated slot 148 operating on the headed stud 147'. It should be noted that the rod bushing 146 is secured to lock disconnect wire 150. A collar 151 confines the spring 149 to permit lock disconnect wire 150 to follow the terminal 147 when manual control 127 is actuated upwardly.

The lock disconnect wire 150 has an offset portion 152, 153 (see FIG. 5) which engages lug 154 to lock bracket 155 pivoted at 156. The slotted portion 168 serves to lock onto ledge 167 of arm shift 131. A pair of springs arranged to horseshoe fashion 230 and 231 aid in returning said arm shift smoothly when manual control 127 is moved upwardly. A stop pin 159 operative in slot 158 tends to hold lock bracket 155 in fixed but releasable disengagement. A keeper plate 160' secured at 160" maintains retractor plate 160 in up and down sliding alignment. Plate 160 is fixedly secured to arm shift 131 by virtue of lugs 193 being attached to lug 192 of arm shift 131. A shouldered pin 166 guides the upper portion of the retractor plate 160.

An open slotted portion 165 operating on retractor plate stud 166 having a right angularly formed lug 161 which functions against incline 186' of film guide support 186, urging the same to the left when lens holder 179 is in focal position. The door 189, shown open in FIG. 5, pivotably on support 176 and is fulcrummed at 177. The lens holder 179 has grooved recesses 181 which snap into a spring retainer which is "C"-shaped (not shown) and slidably mounted in snap-on and snap-off relationships and which maintains door in closed position; and which operates in concert with a picture frame adjustment (not shown). The flange 178 is secured to door 189. The auxiliary film guide 182 is of channeled formation and is secured to film guide support 186 by means of spring mounted elements 183 operating slidably on studs 185. The movement afforded to the film guide 182 prevents film from buckling when projecting, is thus taken away from contact with the film 126 as well as the side tension arm 164 which is moved to the right (FIG. 5) so that its lateral film guides 122 will be out of contact with the film 126 (FIG. 6), the foregoing action is caused by lug 163.

The side tension arm 164 is pivotably secured at 125 which also serves to support a hairpin spring 124 having its termini secured to lugs 125". The side tension arm 164 moves in the direction right and left.

The exposure or projection aperture designated 120 is elongated and enlarged in order to accommodate 8 mm. film and super 8 mm. film.

An elongated opening 119 is large enough to permit the function of the double tooth shuttle 188 which operates down to advance the film, out of sprocket hole engagement, upwardly in idling movement, and reentry into succeeding sprocket holes completing the cycle of operation of the shuttle 188.

The snubber assembly 169 consists of roller 174 and 175 structure aptly disclosed in U.S. Pat. No. 3,331,541. The trigger 170 pivoted at 172 is tripped by the tension exerted upon the film 126 when it reaches the end of projection because of its fixed attachment to the core of the supply reel 250.

The film 126 is guided on the left side by the edge 190 of a fixed guide 190" secured by fastenings 190'. Thus it can be seen that lateral confinement is furnished by edge 190 and lugs 122 whereas front and rear surfaces of the film 126 are confined by the channeled film guide 182.

The shaft 144, on which driver 115 is mounted, rests against the edge 223 of inverted "T" shaped bracket 221 mounted pivotably on the bracket extension 140 having arm 141 terminating in right angularly bent portion 142 and secured by its lower portion 138 to arm shift 131. A spring 145 is anchored to the bracket extension 141 at 227 in order to tensionably urge driven pulley 115 to the left so as to maintain said frictional driver pulley 115 in intimate contact with the outer periphery of the three bladed shutter 116. The arm extension 136 of shift arm 131 is fulcrummed by shaft 116', nut 116" and washer 117.

The driver pulley 195 does the driving of shutter 116 by virtue of its frictional contact with inner rim 195', see FIG. 6. Consequently it can be seen that the inverted "T" shaped oscillating bracket 221 nullifies the influence of spring 145 which is anchored at 227 and 226 to ear 225. An edge 220 of arm shift 131 acts as a bearing surface for bracket 221 which by virtue of its stop lug 230 is spaced as shown at 232 to limit the movement of bracket 221.

FIG. 6 discloses the three-bladed shutter 116 and also reveals the film 126 in position, a lateral guide 190 and complementary lateral guides 122 on the rocker element 123 pivoted at 125 and responsive to spring 124 coiled about its axis 125 engageable by ear 163 engaging central ledge 164 to retract rocker element 123. The twin-tooth shuttle 188 operates in clearance opening 119. Thus it can be seen that it is the province of edge 190", yieldable side guide 122 and (FIG. 5) channel guide 182 to prevent film from disalignment with true projection requirements, preventing at the same time buckling or "pillowing" of the film 126.

In FIG. 6 the driver is pulley 114 which is arranged to operate in tandem alternately with driver pulley 195 so that direct and reversal movements needed for projection and rewind operations are thus obtained. The door hinges 191 are shown as articulating with ears 176 on the projector frame. Pulley 195 is mounted on shaft 197 which is mounted on bracket 196. It should be observed that manual control lever 127 is pivoted at 129 on arm shift lever 131, the elongated slotted portion 148 on lever 128 is needed in order to furnish delayed action to the left end of the lever to initiate movement of ledge 146 first compressing spring 149 so as to trip arm shift lever 155 before motivating bracket 131. The horseshoe-shaped springs 231 are anchored at a stationary arm shift lever 135' and on stud 134 on bracket 131; said springs help to return arm shift lever 131 to its rewind position and smooth the action of movements.

FIG. 7 is partly in elevation and partly in cross section as shown at 7—7 on FIG. 6. Here is disclosed means for retracting shuttle 188 so as to prevent wear and tear on the sprocket holes 126' of film 126. The mechanism consists of a pin 201 movable with the movement of its support arm shift lever 131, a pin with a hemispherical tip 202 actuated by lug 202' in order to prevent wear of shuttle member 188, by pushing shuttle out of engagement with sprocket holes 126'; also to prevent wear and tear of film. The worm drive 109 and lever 87 are articulately secured by fastening 88 and lock washer 87' to prevent loosening of fastening 88. The in and out cam 203 for shuttle 188 causes shuttle to operate in proper cyclical coordination to move in and out of sprocket holes 126' whereas the pulldown cam 206 moves shuttle 188 in proper cyclical movement also, so that the shuttle 18 moves in an orbit which is substantially quadrilaterial in form. The shuttle 188 is mounted in such a manner that it can be subjected to universal movements by virtue of its hemispherical anchorage 205.

REWIND ACTUATION

When the projector is set to function in "RUN" position, the manual control 127 is set up for "RUN" position, the tongue 167 enters notch 168 in lock 155, this leaves free the retractor plate 160 in upward position since it is moved by its tongue engagement 192 in clinched lugs 193 of arm shift 131, thus removing influence on pressure plate lifter 187 and the side tension arm 164. The supply reel spindle 34' is operatively idle and retractor pin 201 is back from position shown on FIG. 7 to permit shuttle 188 to operate in its in and out orbit, the movement is effectuated by a camlike structure 210, (see FIG. 7). The position of in and out cam 203 and up and down cam 211 is in full operative function moving shuttle in a substantially quadrilateral orbit. It should be noted that the up and down cam 206 always operates on shuttle 188 whether in RUN or REWIND positions. The pressure plate 182 is in active position and the side tension arm 164 are in position to completely gauge and confine film during its RUN operation. The arm shift lever 131 is in its upward position which allows lock 155 to engage its notch 160 in tongue 167 of arm shift 131. When rod bushing 146 is up, its spring 149 exerts a slight pressure on bent portion 153 in order to maintain lock 155 in locked position. The forward and reverse handle 200 is in forward position at the front gate of projector. (see FIG. 9). The horseshoe springs 231 are charged at the RUN position and the driving pulleys 115 and 195 are positioned so that inner pulley 195 is in the driver position while outer pulley 115 is idle. Now the projector is set to project the film when the switch which controls the current to motor 110 and lamp, (not shown) closes the electrical circuit. The projector is allowed to operate until the film 126 on the supply reel 81 is completely exhausted whence, by virtue of its fixed attachment to the hub 81' of supply reel 81 tension is created which results in the automatic rewind setting as follows: the tripper latch 173 sets into operation the snubber 169 causing disengagement of lock 155 from engagement with its slot 168 with tab 167, FIG. 5. The arm shift lever 131 is caused to oscillate counterclockwise on its pivot 116' by springs 231 causing pulley 195 to be released from contact with inner rim of shutter 116 and at the same time causing pulley 115 to frictionally engage the outer part of the rim of member 116, thus affording reverse movement of film to cause it to rewind on supply reel 81. The REWIND position of manual control 127 is in a down position as shown in FIG. 6. Both pulleys 115 and 195 are soft rubber-tired to ensure good frictional contact with shutter 116. The takeup reel function and the grasping of the initial end of film being projected is best described in U.S. Pat. No. 3,326,482, assigned to Bell & Howell Company.

A forward, reverse, and neutral control 200 is also provided together with associated mechanism so as to afford means for forward or rewind positions, see FIG. 9, and also to permit exposure of one particular picture frame (when in neutral position) whereby a perforate screen 278 (see FIGS. 8 and 9) is interposed ahead of the lamp (not shown) so as to eliminate the tendency toward film conflagration—or damage, and thus protect the film 126; although there is a loss of light intensity, the projection of the individual frame has apt definition on the screen.

In FIG. 6 the arm shift 131 has secured thereto bracket 140 with an extending arm 141 and a right angularly formed lug 142. The member 221 articulates about pin 222. The bracket 221 by virtue of its edge 223 serves to urge shaft 144 to the left when the mechanism is cocked so as to urge pulley 115 into intimate contact with shutter 116, and maintain it so, until the mechanism is motivated to bring pulley 195 into intimate contact with interior surface of rim 195' of shutter 116; thus reversing direction of shutter 116. The lug 142 has a bore through which rod 234 operates and collars 236 and 237 can be adjustable set by setscrews (not shown) indicating a lost motion therebetween in order to provide a true translation of the motion needed when rod 150, to which it is operatively connected, is moved through its distance to perform other functions.

FIG. 10 discloses a front elevational view of a projector and depicts the position of the supply reel support arm 15 and the takeup reel support arm 15', the dotted lines indicating the positions of said support arms which positions do not militate against the gear trains in each arm nor does movement of the arms disturb the train of gearing from the prime mover through gear train mounted on rear of gear plate 60, so that when arms are in position shown in full lines, arm 15 supports movably a supply reel 250 whereas the arm 15' supports takeup reel 151.

Figure 8:
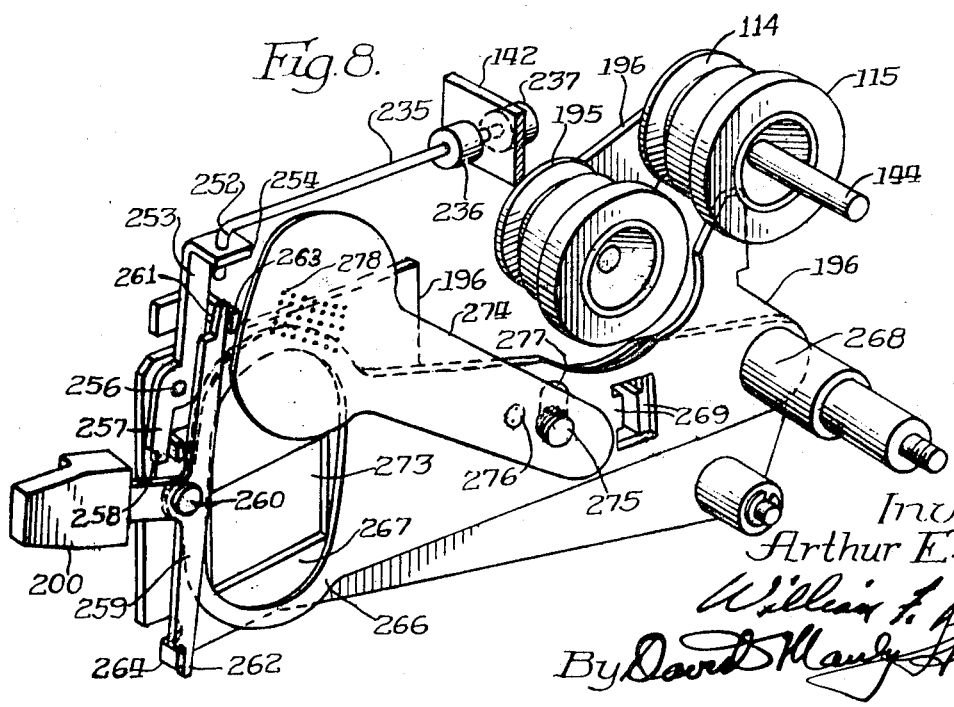
FIG. 8 is a perspective view of the actuating plate element in concert with the perforated screen element.

FIGS. 8 and 9 illustrate a bracket 280 on which are mounted the fire shutter actuating lever 266 having an enlarged opening 267 so as not to interfere with film projection. The lever 266 is articulately secured at 268 and is provided with two lugs 269 to anchor the crossed legs 270, 271 of a hairpin spring, which in turn swivels about center 272. The fire shutter 274 is pivoted at 276 and has a guide 275 operating in arcuate slot 277 on lever 266. The fire shutter in concert with a dichroate glass window (now shown) reduces the infrared rays of heat from the lamp when still projection takes place namely, when the position of manual control 200 shown in FIG. 9 is in neutral position. The arcuate slot 277 in lever 266 and pin 275 limit motion of fire shutter 274. Thus while the manual control operates within recess 265, the resultant motion accorded the fire shutter is governed by the arcuate slot 277. The fire shutter 274 is provided with a perforate screen 278 and is, in this view, positioned in front of the aperture 120 to protect the film from burning or "pillowing." An enlarged opening 273 in support bracket 280 also helps to produce a clear light path from lamp through film and to the projection screen, unless light intensity is reduced consequently inhibiting the heat rays to afford the protection needed for still projection, notwithstanding the loss of light the projection on the screen is well defined and free from aberration or fringe.

A foolproof and positive latching mechanism consists of the bellcrank 253 provided with a lug 254 to which wire arm 235 is secured, its function being to liberate arm 141 of shift arm 131, the collars 236 and 237 are spaced in proper relation to afford lost motion to rod 235 since the true translation of motion to actuate arm 141 is less than the movement of member 235. The bellcrank 253 is also equipped with a lug 255, the offset 257 and is pivoted at 256, with a lug 258. A trip lever 259 equipped with alternate latching teeth 261 and 262 oscillates on pivot 260 so that either tooth 262 or 262' engages the lug 263 or disengages therefrom and causes tooth 262 to engage the lug 264.

On bracket 196 a complementary spring assembly is mounted on plate 279 which has a recessed portion 281 and 281' from which are struck out, or stamped out, lugs 285 and 286, the province of which is to retain fixedly spring guide 287. The lugs 282 operate between the washer 283 and the blade 284 so as to actuate either of the two springs 288 alternately. Hence the hairspring 270 and springs 288 operate in concert to effectively cusion the motions imparted to the mechanism operating selectively the forward or reverse driving pulleys 115 or 195.

What is claimed is:

1. A mechanism for automatically rewinding a film after it has been transported in one direction through a motion picture projector, the projector having spindle supported supply and takeup reels, a forward projection mode, a reverse projection mode and a rewind mode, the combination comprising:
    drive means including a friction drive for rotating said spindle supported supply reel in a rewind direction during said reverse projection mode;
    coupling means operable from an ineffective position to an effective position and in said effective position for coupling said drive means to said spindle supported supply reel for bypassing said friction drive and for positively driving said supply reel in the rewind direction during said rewind mode;
    film tension-sensing means shiftable to an actuated position by the film when the end of the film has been reached from said forward projection mode; and
    control means operable by said film tension-sensing means to automatically actuate said coupling means to said effective position for positively driving said spindle supported supply reel during said rewind mode.

2. A mechanism as defined in claim 1 wherein said control means includes a lever operable to actuate said coupling means to said effective position responsive to said film tension-sensing means shifting to said actuated position.

3. A mechanism as defined in claim 2 further comprising a manual control member operatively connected to said lever for selectively shifting said coupling means between said ineffective and effective positions.

4. A mechanism as defined in claim 2 wherein said control means includes a lock member operable to lock said lever in a position for holding said coupling means in said ineffective position.

5. A mechanism as defined in claim 4 wherein said control means includes spring means for operating said lever to actuate said coupling means from said ineffective position to said effective position when said lock member releases said lever.

6. A mechanism as defined in claim 5 wherein said lock member is actuated by said film tension sensing means for releasing said lever.

7. A mechanism as defined in claim 1 wherein said control means includes a lock member operable to hold said coupling means in said ineffective position and operable to release said coupling means to permit said coupling means to move to said effective position.

8. A mechanism as defined in claim 1 wherein said coupling means is supported adjacent said spindle supported supply reel and said control means includes a linkage extending from adjacent said film tension-sensing means to said coupling means, and said linkage being operable by said film tension-sensing means to actuate said coupling means from said ineffective position to said effective position.

* * * * *